United States Patent [19]

Brown, Jr.

[11] 3,831,096

[45] Aug. 20, 1974

[54] TELEMETRY RECEIVER PHASE DETECTOR OUTPUT SIGNAL PROCESSING CIRCUIT

[75] Inventor: Houston A. Brown, Jr., Granada Hills, Calif.

[73] Assignee: International Telephone and Telegraph Corporation, New York, N.Y.

[22] Filed: Apr. 24, 1972

[21] Appl. No.: 246,676

[52] U.S. Cl. .................... 325/321, 178/68, 328/55, 329/122, 340/206

[51] Int. Cl. .................... H04b 1/10

[58] Field of Search .................... 325/321, 330, 38 A; 178/66, 67, 68, 88; 340/167, 345, 347 DD, 206 R; 329/145, 122, 50; 331/25, 23; 328/55; 307/293

[56] References Cited

UNITED STATES PATENTS

| | | | |
|---|---|---|---|
| 3,238,299 | 3/1966 | Lender | 178/68 |
| 3,337,865 | 8/1967 | Lender | 325/38 A |
| 3,400,369 | 9/1968 | Cooper | 178/66 R |
| 3,406,255 | 10/1968 | Lender | 178/88 |
| 3,517,338 | 6/1970 | Herman | 178/66 R |
| 3,657,653 | 4/1972 | Wilkinson | 178/68 |

*Primary Examiner*—Robert L. Griffin
*Assistant Examiner*—A. M. Psitos
*Attorney, Agent, or Firm*—William T. O'Neil

[57] ABSTRACT

A doublet signal detection arrangement using a phase lock loop to generate a constant timing signal. A sampling technique operating from the constant timing signal reproduces one side of the doublet with essentially perfect shape and no edge jitter. The timing signal can then be used to further decode the signal.

9 Claims, 2 Drawing Figures

TELEMETRY RECEIVER PHASE DETECTOR OUTPUT SIGNAL PROCESSING CIRCUIT

BACKGROUND OF THE INVENTION

1. Field of the Invention

The invention relates to signal detection generally, and more specifically, to detection of doublet signals, as commonly employed in telemetry systems.

2. Description of the Prior Art

At the outset, it should be understood that the so-called doublet, which is a standard type of signal in telemetry systems, is a fundamentally balanced bi-polar signal. Each doublet "digit" includes a space pair of single sine-wave cycles. A more definite description of the nature of doublet signals will be undertaken as this description proceeds in respect to the drawings.

In telemetry transmission systems the doublet signal format has been chosen for certain systems because it is inherently balanced and therefore consistent with phase detection.

Prior art detector schemes of the general type have included basically peak detecting arrangements which sense one peak of the doublet and output a corresponding pulse. Such detectors are very sensitive to noise and suffer from considerable edge jitter, with the result that decoding errors are relatively large, especially in marginal signal-to-noise conditions. More advanced detectors are known in the prior art, for example, one such detector which provides relatively good performance in the marginal signal-to-noise ratio condition employed two phase lock loops for each of the possible doublet combinations, a relatively complicated and costly arrangement. The manner in which the present invention improves on the prior art will be understood by those skilled in the art as this description proceeds.

SUMMARY OF THE INVENTION

The present invention has for its general objective, the provision of a relatively simple doublet detection arrangement which is substantially jitter-free, even in marginal signal-to-noise ratio conditions. Whenever simplicity is provided, there are obvious cost and reliability advantages.

The present device uses a simple phase lock loop to generate a constant timing signal and a sampling technique that reproduces one side of the doublet with substantially perfect shape and substantially no edge jitter. The phase lock loop of the device is essentially a digital phase lock loop including a phase detector, amplifier, loop filter and a voltage controlled oscillator. The raw sine or raw doublet from a telemetry receiver phase detector is amplified and goes into a logic gate. The doublet plus 90 degrees (i.e., the cosine) coming from the receiver coherent phase detector, is filtered through a bandpass filter and amplified. The resulting sinewave goes through a digital phase lock loop which generates the higher frequency timing signals, as well as a VCO cosine wave. The timing signals are synchronized with the cosine by virtue of the higher frequency voltage controlled oscillator and a frequency divider inserted in the VCO feedback loop to the phase detector. Since there is information on the raw sine input signal only when raw cosine is high in value, that portion of raw sine corresponding to low raw cosine value is discarded by the logic circuitry. This results in improved noise immunity. The doublet detector of the present invention may be used in any receiver employed to detect the doublet type of transmitted signal. An example of this type of signal is that which is transmitted by U.S. Navy Navigational Satellites. The detector of the present invention is also adapted for use in long distance data transmission over wires where noise immunity and pulse stability are important.

The manner in which the present invention accomplishes its objective will be better understood as this description proceeds.

DESCRIPTION OF THE PREFERRED EMBODIMENTS

Figures 1, 2:
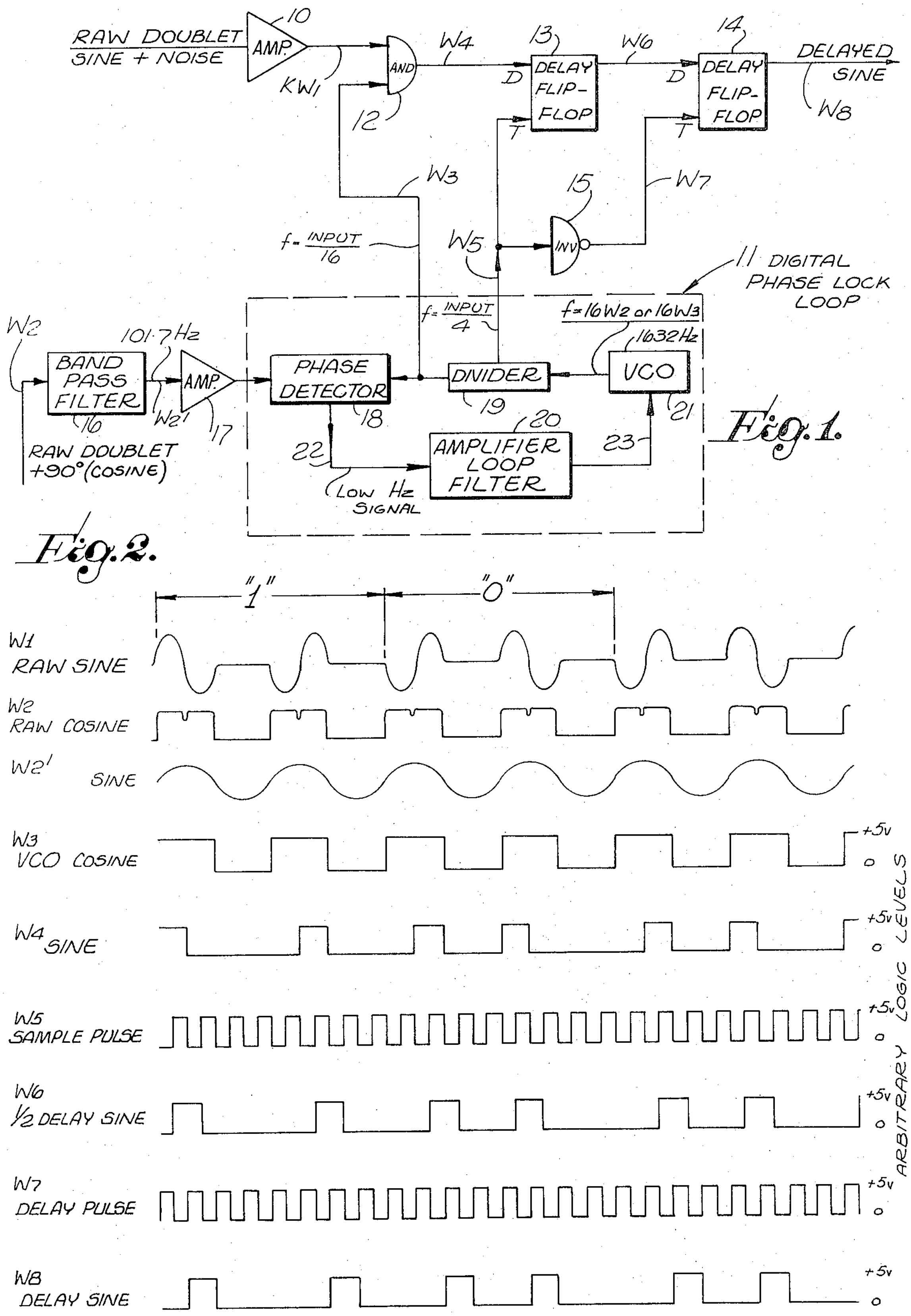
FIG. 1 is a schematic block diagram of a typical arrangement in accordance with the present invention.
FIG. 2 is a series of typical waveforms at various points in the circuit of FIG. 1, with typical nominal logic levels indicated.

Referring now to the drawings, a detailed description will be undertaken in respect to FIG. 1 with references to FIG. 2, as appropriate.

As already indicated, the so-called doublet is a known waveform in telemetry transmission. The inputs to FIG. 1, which are identified as W1 and W2, are the raw doublet sine and cosine waveforms, respectively, from the receiver. These are depicted and correspondingly identified as the first two waveforms in the FIG. 2 showing. They are essentially the output waveforms from a phase lock loop receiver having coherent phase detection. Such waveforms, as hereinbefore indicated, are well known in this art and are to be found in typical receiving equipment associated with satellite tracking equipment, for example, in the so-called AN/SRN-9 Navigational Satellite equipment.

In FIG. 1, the raw sine waveform W1 is applied to an amplifier 10, the output of which ($KW_1$) is applied to a logical AND gate 12. The output from this gate 12, identified as W4, can only be present when the W3 signal at the other input of gate 12 is also contemporaneously present. This signal W3 has the same frequency as the raw cosine W2. Moreover, the signal W3 may be thought of as being a clock-pulse signal in effect. As depicted in FIG. 2 it will be seen to resemble the raw cosine signal W2 in the form of a more or less standardized square wave.

As this description proceeds, the origin of the signal W3 will be understood, however, for the moment its presence and time relationship as depicted in FIG. 2, may be assumed.

In keeping with the logical function of the gate 12, its output labeled W4 is as shown in FIG. 2, that is, an output signal occurs only during the positive portion of W3 and W1 simultaneously. This output signal W4 from the gate 12 is applied to the D input of a delay flip-flop 13. This flip-flop produces the waveform W6 which is a "half-delayed sine" signal. That is, it is delayed one-half pulsewidth as compared to W4. This particular flip-flop 13 is adapted as a logical element to provide the output W6 only if the input signal on the T terminal is also present. This input signal W5 is, for example, four times the frequency of the W3 or W4 signal. It is convenient in operation, and, in fact, an important part of the present invention that the voltage controlled oscillator 21 is operated at a frequency which is a multiple of the frequency of the Wp or W2 signals. The multiple 16 was used in a typical embodiment of the present invention, or in other words, the voltage controlled oscillator 21 was operated at a typical frequency of 1632 Hz which is 16 times the frequency of W2 or W3. The factor 16 is a convenient one for digital circuitry in that it amounts to $2^4$ so that the divider 19 can conveniently provide a countdown by 16 in order to generate the signal W3 at its output, as well as the signal W5, the latter being one-quarter of the VCO frequency or four times the frequency of W3.

In accordance with the aforementioned operating criteria for the flip-flop 13, the output waveform W6, or the so-called "half-delayed sine" is depicted at W6. A similar delay flip-flop 14 operates with the said W6 signal at its D input and a signal W7 inverted from W5 by the inverter 15 applied to its T terminal. The inversion of the W5 signal operates to interchange its positive and negative going portions. By comparison of waveforms in FIG. 2, it will be realized that the purpose of these connections is to produce the fully delayed sine signal W8 which is, in effect, the final output of the circuit according to the present invention. That is, signal W8 is delayed a full pulse width as compared to the signal W4, the signal W4, on the other hand, being the squared or standardized positive-going portion of the W1 raw sine input signal. The signal W8 is a steady signal substantially free of the type of jitter or edge timing indeterminancy which might occur due to the triggering of gate number 1 through the amplifier 10 from the signal W1 in conditions of relatively poor signal-to-noise ratio. The signal W1, of course, includes noise as well as the raw doublet sine signal.

The dotted-line-enclosed block 11 contains the digital phase lock loop components of the present invention. These components include the 2 $\pi$ phase detector 18, the amplifier and loop filter 20, the voltage controlled oscillator 21 and the divider 19. The phase detector 18 operates to compare the signal W3 with W2 to produce a phase error signal of low frequency at its output 22. This signal on lead 22 is amplified and low-pass filtered in 20. The block 20 thus determines the bandwidth of the phase lock loop and may be thought of as the equivalent of an integrator. Its function as an element of a phase lock loop is comparable to similar components used in well known prior art lock loop circuits. The output 23 of block 20 provides the feedback signal for controlling the oscillator 21 as also understood in the prior art. This signal 23 would be expected to have a steady direct current value when the loop is locked and functioning correctly.

It will be realized that the combination taken as a whole operates to provide a steady jitter-free output signal W8. This signal may then, of course, be used to further decode the W1 signal, or for any other synchronous control or coding function related thereto.

Typical voltage levels for the signals illustrated in FIG. 2 are as indicated thereon. The bandpass filter 16 might typically have a "Q" of 10.

It will be realized from the foregoing description and examination of the circuit of FIG. 1, viz-a-viz, the waveforms of FIG. 2, that the necessary sample pulse from the divider 19 is used such that the positive edge coincides with the middle of each possible raw sine maximum, thereby allowing all pulses to settle down and permitting the minimization of any edge-jitter from the input sine signal, as transferred to the output W6.

This process is repeated in the flip-flop 14, except that the sample pulse is inverted to shift the output sine signal so that the edges coincide with the edge of the VCO cosine signal W3, the latter acting as a clocksignal, in effect. This relationship is particularly important since it serves to reconstruct the top of the doublet signal faithfully.

It will be readily understood that the same process may be used to decode the "bottom" of the doublet signal.

It will be realized by those skilled in this art that modifications and variations based on the principles of the present invention, are possible. For example, different kinds of flip-flops could be used; or the input doublet could be filtered in amplifier 10.

It is to be understood that the drawings and this description are intended to be illustrative and typical only, and are not to be regarded as constituting a limitation on the scope of the invention.

What is claimed is:

1. A circuit responsive to sine and cosine receiver phase detector pulse output signals for detecting doublet waveforms in the presence of noise, comprising:

pulse tracking means including a phase lock loop responsive to and for tracking said cosine pulse signal for generating first and second control pulses having frequencies equal to and a first multiple of the frequency of said cosine pulses, respectively, said phase lock loop including a voltage controlled oscillator operating at a frequency which is a multiple of the frequency of said sine pulse signal, and including a frequency divider for producing said first and second control pulses as sub-multiples of the frequency of said voltage controlled oscillator;

first logic circuit means responsive to said sine pulse signal and said first control pulses for providing a third signal exclusively during a predetermined condition of both said sine and first control pulses;

and second logic circuit means responsive to said third signal and said second control pulses for producing a delayed third signal substantially a full pulse width delayed third signal thereby providing a stable detector output.

2. Apparatus according to claim 1 in which said pulse tracking means voltage controlled oscillator operates at a frequency which is a first integral multiple of the frequency of said cosine pulses, said frequency divider is connected to the output of said oscillator for generating said first and second control pulses, a phase detector is connected to said first control pulse output from said frequency divider and said cosine pulse signal for generating a phase error signal, and in which there are provided feedback means responsive to said phase error signal for generating and applying a frequency controlling signal to said oscillator, said second control pulse being defined as having a frequency which is greater by a first integral factor than the frequency of said first control pulse but smaller by a second integral factor as compared to said oscillator frequency.

3. Apparatus according to claim 2 in which said second logic circuit means comprises first and second delay flip-flop circuits, and an inverter circuit responsive to said second control pulses to produce inverted second control pulses, said first flip-flop responding at its D input to the output of said first logic means and to said second control pulses at its T input, and said second flip-flop responding at its D input to the output of said first flip-flop and to said second control pulses at its I input.

4. Apparatus according to claim 2 in which said frequency divider is arranged to produce said second control pulses at a frequency which is one fourth of the frequency of said oscillator and to produce said first control pulses at a frequency which is one fourth of the frequency of said second control pulses.

5. Apparatus according to claim 2 in which said first and second integral factors are each equal to four.

6. Apparatus according to claim 3 in which said first logic circuit comprises a logical AND circuit.

7. Apparatus according to claim 2 including a bandpass filter connected in series with said cosine input for converting said cosine wave substantially to a wave at the fundamental frequency of said cosine pulses with harmonic content substantially eliminated.

8. Apparatus according to claim 2 including a loop amplifier and filter in the circuit path for applying said frequency controlling signal to said oscillator, for augmenting the tracking accuracy of said phase lock loop.

9. Apparatus according to claim 8 including filter means associated with said loop amplifier for determining the frequency response characteristic of said phase lock loop.

* * * * *